United States Patent [19]
Schweitzer

[11] 4,094,146
[45] June 13, 1978

[54] SOLAR ENGINE

[76] Inventor: Earl O. Schweitzer, 29353 Luxona Rd., Wickliffe, Ohio 44092

[21] Appl. No.: 684,115

[22] Filed: May 7, 1976

[51] Int. Cl.² .......................... F03G 7/02; F02C 1/04
[52] U.S. Cl. ..................................... 60/641; 60/682;
92/100; 417/392; 417/395
[58] Field of Search ............... 60/516, 517, 682, 650,
60/641; 417/392, 394, 395, 401, 382; 126/270, 271; 91/466; 92/100

[56] References Cited
U.S. PATENT DOCUMENTS

| 14,690 | 4/1856 | Ericsson | 60/682 |
|---|---|---|---|
| 28,910 | 6/1860 | Stillman | 60/682 |
| 230,323 | 7/1880 | Molera et al. | 126/270 X |
| 862,867 | 8/1907 | Eggleston | 417/390 |
| 1,326,092 | 12/1919 | Pratt | 60/517 X |
| 1,623,605 | 4/1927 | Tainton | 417/395 |
| 2,105,196 | 1/1938 | McCauley | 92/100 |
| 3,203,167 | 7/1962 | Green, Jr. | 60/682 |
| 3,859,980 | 1/1975 | Crawford | 126/271 |
| 3,861,151 | 1/1975 | Hosokawa | 60/649 X |
| 3,934,323 | 1/1976 | Ford et al. | 126/271 X |

FOREIGN PATENT DOCUMENTS

| 62,136 | 3/1891 | Germany | 60/682 |
|---|---|---|---|
| 23,273 of | 1910 | United Kingdom | 126/271 |

Primary Examiner—Allen M. Ostrager
Assistant Examiner—Stephen F. Husar
Attorney, Agent, or Firm—Baldwin, Egan, Walling & Fetzer

[57] ABSTRACT

A solar engine including an air motor driven by a quantity of pressurized hot air from a solar heater vessel and including an air pump for pumping substantially an equal mass of cool air back into the solar heater. The driving action of the air motor and simultaneous pumping action of the pump is accomplished in one embodiment by means of a moving piston which separates the driving and pumping sides of the air motor enclosure, whereby substantially both displaced volumes are substantially equal. Air is used as both the heat transfer means and as the actual working fluid. The engine provides for an unlimited life for the solar collector, and an engine of relatively low friction and substantial simplicity.

6 Claims, 8 Drawing Figures

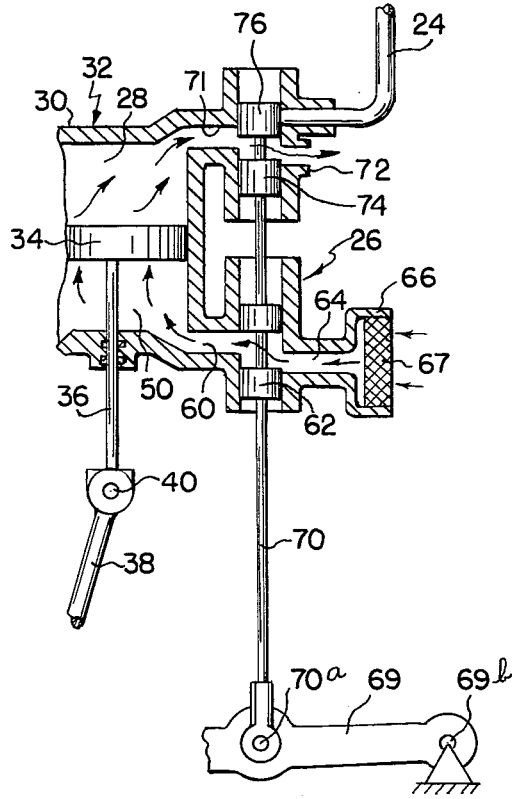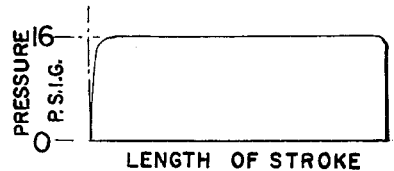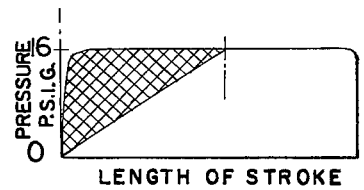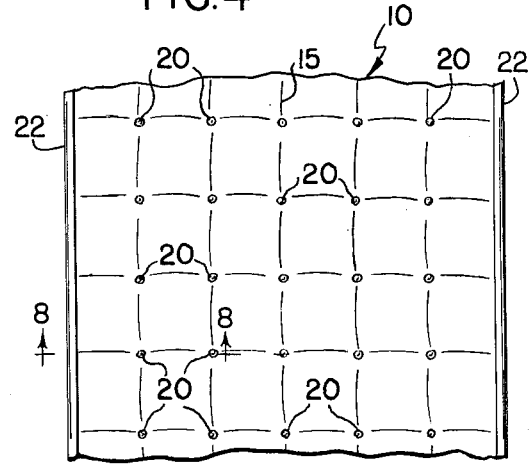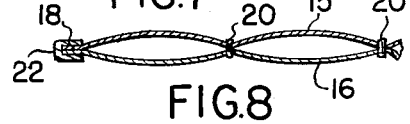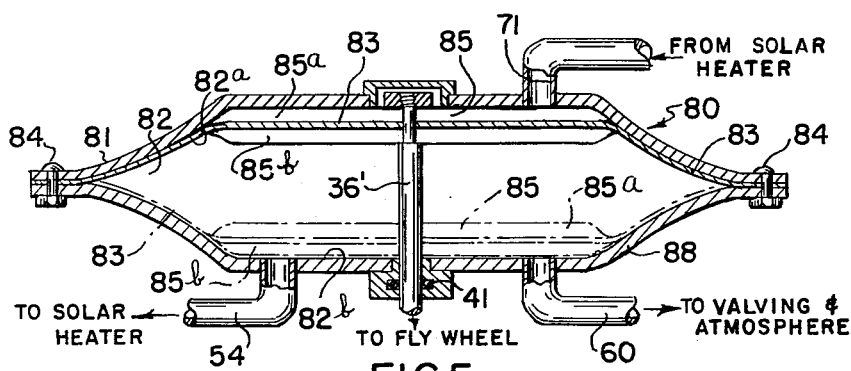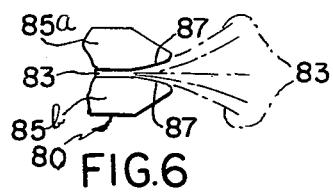

SOLAR ENGINE

This invention relates to a solar engine, and more particularly to a solar engine which is of generally simple and economical construction, and which is practical for use in individual power systems.

BACKGROUND OF THE INVENTION

Use of solar energy and the art relating thereto represents a broad spectrum of solutions, and many different ways have been suggested for attempting to efficiently use solar energy. The use of electrical solar cells is one known method of utilizing solar energy, but such method involves a large investment in devices having a generally limited life.

Other power producing mechanisms known are designed to use working fluids, such as "Freon". Continued and expanded use of fluorinated hydrocarbons presents many problems, and is possibly harmful due to its effect on the ozone layer of the upper atmosphere.

An ideal solution would be to provide a solar energy device which would directly convert solar energy to electricity, with such a device having a substantial long life. The cost of the solar collector is an important factor in the choice of a system, and the ability for individuals having their own system rather than having public utilities, is a possible answer to the problem of utilization of solar energy. Individual systems, if they are used, however, have to be easy to understand and easy to install, and be of relatively low cost. It is in answer to these needs that the present invention is most useful.

U.S. Pat. No. 1,424,932 discloses a solar heating device which in FIG. 3 thereof is utilized for operation of an air motor including flywheel mechanism. A heating member 8 receives the concentrated rays from the reflectors of the device heating up the air in the heating unit, and operating the air engine 41 connected to the flywheel.

U.S. Pat. No. 3,436,908 discloses a solar power unit wherein air is taken in at the lower end of a diagonally arranged duct 12. The air is passed through the duct where it is heated by solar energy, and is thus expanded and used to drive a rotor 22 at the upper end of the heating duct, which rotor is connected to an electric power generator 25, for producing power.

SUMMARY OF THE INVENTION

The present arrangement provides a solar engine which includes a collector or pressure vessel adapted for containing and heating air, with an air motor coupled to the collector and adapted to be driven by a mass of heated air from such collector, with the air motor including pump means for pumping into the collector an amount of air substantially equal to the mass of heated air removed from the collector for driving the air motor, and whereby the air motor has excess power output adapted for doing work. The solar engine is adapted to be of relatively lightweight, economical construction for convenient usage thereof by an individual, in generation of power, such as for instance electrical energy.

BRIEF DESCRIPTION OF THE DRAWINGS

FIG. 2 is a fragmentary, sectional view of the air motor and associated valving arrangement during the upstroke of the air motor preparatory to the power stroke thereof.

FIG. 3 is a diagram of pressure versus length of stroke in the air motor.

FIG. 4 is a diagram of pressure versus length of stroke in the lower, cold air pump section of the air motor.

FIG. 5 is an illustration of a modified motor arrangement for driving the flywheel of the solar engine, utilizing a flexible diaphragm power head as compared to the piston and cylinder air motor arrangement of the first described embodiment.

FIG. 6 is an enlarged, fragmentary section of the diaphragm attachment of the motor mechanism of FIG. 5.

FIG. 7 is a fragmentary, top plan view of a solar collector or pressure vessel for use in the solar engine; and FIG. 8 is an enlarged, sectional view, taken generally along the plane of line 8—8 of FIG. 7 looking in the direction of the arrows, and showing the quilt-like structural arrangement of the collector.

DESCRIPTION OF PREFERRED EMBODIMENTS

Figure 1:
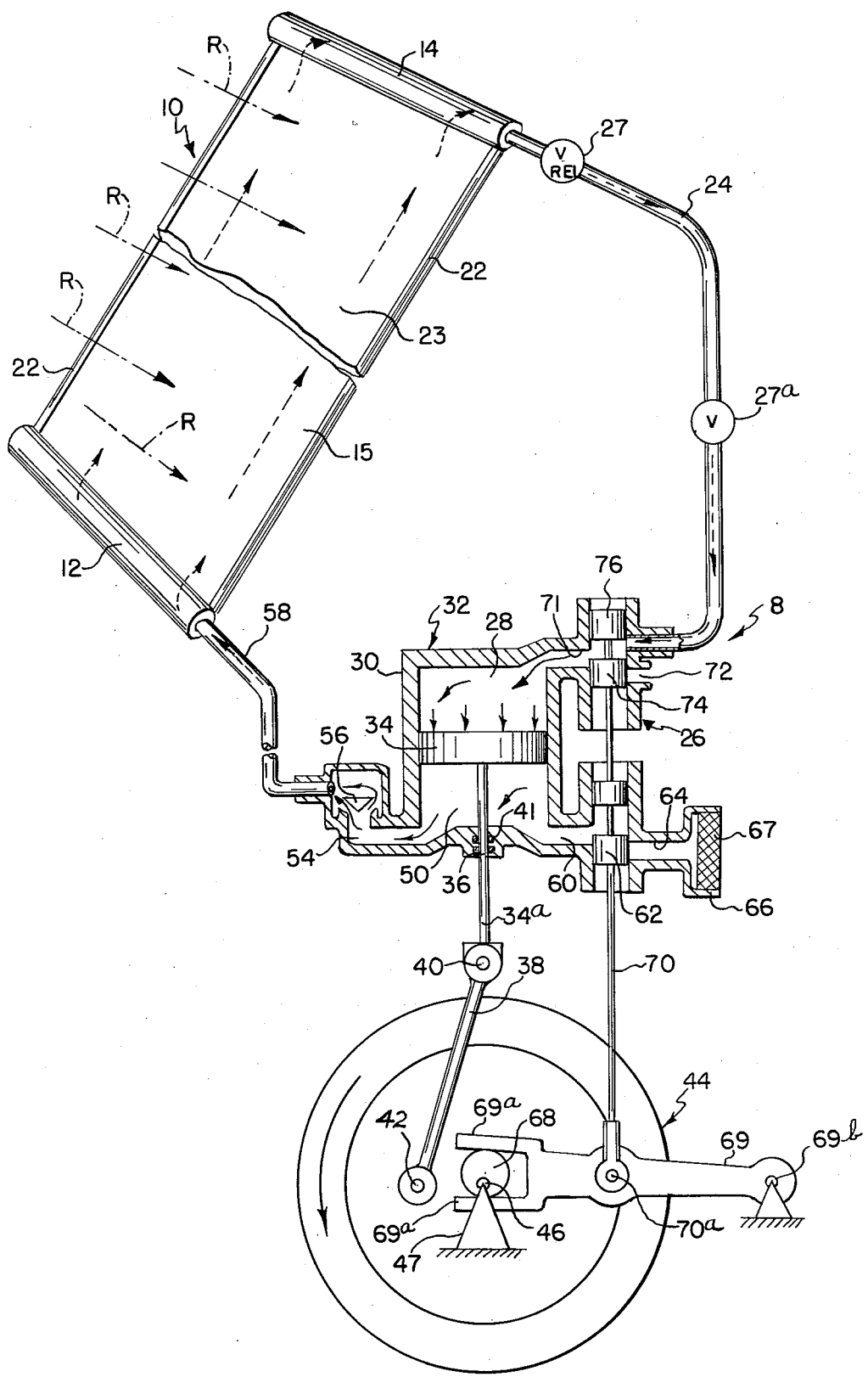
FIG. 1 is a generally perspective, diagrammatic, sectional, partially broken elevational view of the total system, showing the piston of the air motor moving in a downward or power stroke.

Referring now again to FIG. 1, there is illustrated a solar engine 8 embodying the invention. The solar engine includes a solar collector or pressure vessel 10, having a relatively large area for exposure to the rays R of the sun, and which is preferably formed of thin metal possessing good heat conducting characteristics. The vessel preferably includes a lower cool air entry header 12, and an upper hot air exit header 14. The sun heats the interior of the pressure vessel, producing a pressure due to the expansion of the air therein.

As can be seen from FIGS. 7 and 8, the collector vessel preferably has peripheral flattened edge areas 18 along its lateral sides, and is preferably of a quilt-like construction. The upper and lower plates 15 and 16 forming the vessel are secured as by spaced rivets 20 or by spot welds, into general engagement with one another. The peripheral edges of the plates along aforementioned border areas 18 can be provided with a U-shaped spring clamping rail 22 for reinforcing the vessel edges. Any suitable material may be utilized for the metal skin of the solar collector 10, but thin sheets of stainless steel are especially ideal.

As the sun heats up the air in the interior of the collector 10, the pressure of the air causes air flow away from the main body 23 of the collector and through the upper exit header 14 to the hot air pipe 24, and thence into the valving control 26, which in the position illustrated in FIG. 1 is open to the interior upper chamber 28 of the cylinder 30 of air motor 32. Relief valve 27 and control valve 27a may be provided in line 24.

The pressurized air exerts a pressure on the top of the piston 34 of the air motor, causing it to move downwardly. Piston rod 34a of the piston 34 extends through an opening 36 in the air motor, and is pivotally coupled to a connecting rod 38, as at 40. Seals 41 coact with the piston rod 34a to seal opening 36. Connecting rod 38 is in turn movably, or rotatably coupled, as at 42, to the flywheel mechanism 44, which is mounted in secured relation to a shaft 46, suitably mounted for rotation about a generally horizontal axis, and preferably as by means of anti-friction bearings 47. Downward movement of the piston 34 of the air motor 32 causes the air in the lower pump chamber 50 of the air motor to be compressed and driven into and through exit chamber 54 and past check valve 56, into the exit pipe 58, to the lower cool air entry header 12 of the collector 10.

It will be seen that at the beginning of the downward power stroke of the air motor, the air contained in the lower pump portion 50 of the cylinder housing 30 is at atmospheric pressure. As can be seen from FIG. 1, during the power stroke of the piston 34, the atmospheric air inlet passage 60 of the pump section of the air motor is closed to the atmosphere by the land 62 of the control valving 26, which closes the ambient air intake passage 64. Passage 64 communicates with intake bell 66, which may have a removable filter 67 therein, for cleaning the intake air. The amount of cool air forced into the solar collector vessel by the pump section will generally be equal to the amount of air which came from the solar collector via the exit pipe 24; while the volume of the hot air from the collector will be somewhat larger than the volume of the cool air due to the different densities thereof, the weights of both the hot and the cold air will be substantially the same. Accordingly, the amount of air being pushed back into the collector by the pump section of the air motor will be the same as the amount of hot air coming out of the collector. Since the volume of air coming out hot from the collector is greater than the volume of cool air pushed back into the collector by the pump section, there is a greater amount of energy in the heated air volume than in the cool air volume. This energy difference is imparted to the flywheel and its movement results in shaft horsepower. The movement of the flywheel and rotation of shaft 46 produces power which can be removed as by means of an electrical generator (not shown) resulting in energy which can be used to do useful work.

As the flywheel 44 continues to turn, a cam 68 secured thereto rotates, causing the valve lever 69, which has arm portions 69a coacting with the cam 68, to pivot about its rotational axis of support 69b, which is mounted on anti-friction bearing means, thereby causing the valve lever 69 to pull downward on the valve stem 70 rotatably coupled as at 70a to the valve lever, causing the valving to move to the position illustrated for instance in FIG. 2.

As can be seen from FIG. 2, downward pull on the valve stem 70 due to the downward pivoting movement of valve lever 69 causes downward positioning of aforementioned land 62, thus opening up the intake passage 64 to the air motor pump chamber 50. The energy imparted to the flywheel 44 by the air motor causes the flywheel to continue rotating, thus driving the piston 34 upwardly, causing air to flow via intake passage 64 into the pump chamber 50.

The air in upper chamber 28 of the air motor 32 during upward or exhaust movement of the piston 34, is exhausted via exhaust passageway 71 (FIG. 2) which communicates with port 72 due to the movement of land 74 downwardly to the position illustrated. It will be seen that during the exhaust or upward stroke of piston 34, land 76 of valving 26 closes off the hot air pipe 24, and prevents air from being forced back into the collector 10. Also, it will be seen that during the exhaust or upward stroke of the piston 34, the check valve 56 of the pump section of the air motor is closed, thus preventing air from being drawn out of the solar collector 10.

As the piston 34 moves upwardly, a decrease in pressure below atmospheric pressure in pump chamber 50 causes cool ambient air to enter through the filter 67, and intake passage 64 and port 60 into the pump chamber 50, until the pressure in the chamber 50 is equal to atmospheric pressure. Upward motion of the piston 34 continues until substantially all of the hot air in upper motor chamber 28 is exhausted via the exit port 72 to atmosphere and a fresh charge of ambient air has been brought in to fill the lower pump chamber 50, after which the cycle starts all over again, the energy in flywheel 44 continuing to cause movement of the piston 34 and movement of the valving control 26 to a position wherein pressurized hot air from collector 10 once again enters the upper motor chamber 28.

Referring now again to the diagram of FIG. 3, the latter shows that the pressure produced by the heated air from the collector vessel 10 pushes on the top of the piston in upper motor chamber 28 during the entire downward stroke of the piston 34, with a pressure of, for instance, 16 pounds per square inch gage. FIG. 4 illustrates that there is zero pressure at the beginning of the power stroke in the lower pump section chamber 50 and that the pressure increases until it is equal to the heated air pressure in the upper motor chamber. Then, during the remainder of the power stroke, the flywheel 44 carries the piston 34 downward and the cool volume of air beneath the piston is pushed into the solar collector vessel as aforedescribed. The cross hatched area of the diagram of FIG. 4 represents in general the energy difference that is imparted to the flywheel. This amount of energy, less the amount used up in friction, is the amount available at the shaft output of the mechanism 8 to do work. Accordingly, the frictional energy of the system is maintained at a minimum, and by using for instance anti-friction bearings for the flywheel shaft mounting and the linkage arm 69 mounting, and very low friction sliding seals (not shown) for the piston 34 and control valving 26.

Referring now to FIG. 5 and 6 there is illustrated a modified form of air motor power unit for actuating the flywheel. Since low friction is very important to effective use of the solar engine, the arrangement illustrated in FIG. 5 may produce less friction and therefore be more efficient. The power unit 80 comprises a housing 81 defining a chamber 82 in which is disposed the flexible diaphragm 83 anchored as at 84 adjacent the periphery of the head 80, thereby dividing chamber 82 into an upper portion 82a and a lower portion 82b. The diagram 83 is clamped between head 85 which fits snugly against the upper portion of the housing 81 when in raised position, which squeezes all of the hot air out through the exhaust passage 71 which is connected to valving 26 in a generally similar manner as the first described embodiment. The head 85 also fits snugly against the lower portion of the housing 81 during the downward or power stroke of the unit, as caused by entry of pressurized heated air from line 24 into passageway 71 and upper chamber section 82a. The interior surface sections of the housing 81 laterally of the central head receiving sections thereof are generally convex and engage the portions of the diaphragm outwardly from the head 85 thereof in generally surface-to-surface relation in the respective maximum intake and power stroke positions of the diaphragm and attached rod 36', as can be seen in FIG. 5, for helping to increase the efficiency of the engine mechanism. The piston rod 36' coupled to the diagram head transmits the power to the flywheel in a similar manner as the first described embodiment, and pumps air from lower chamber section 82b into passageway 54 and line 58 to the collector vessel 10. Piston rod 36' also holds the head plates 85a, 85b together, clamping the diaphragm 83. FIG. 6 illustrates the formed generally arcuate edges 87 of the head plates, so as to not cause a sharp bending of the diaphragm as it flexes during operation of the power unit 80.

Insulation of the heated zones of the solar engine is desirable to prevent heat loss and thus give greater efficiency to the device. The higher the heat provided of course, the higher the pressure the device can generate, and the more efficient the operation. For instance, the underside of collector vessel 10 is preferably insulated to prevent heat loss therefrom. Moreover, a covering of, for instance, glass or plastic could be provided over the energy receiving face of the vessel, or a portion thereof to provide a "greenhouse effect" in a manner known in the art, to increase the heating efficiency of the solar energy on the collector vessel 10.

Furthermore, if so desired, the hot air exhaust from port 72 during the upward stroke of piston 34, could be fed back by piping or conduit to the vessel, for preheating the vessel, and thus further aiding in increasing the heating efficiency of the collector vessel. While a single cylinder air motor has been shown, it will be understood that a multiple cylinder power and pump unit could be provided.

From the foregoing description and accompanying drawings it will be seen that the invention provides a novel solar engine including an air motor unit driven by a quantity of hot pressurized air from a solar collector or vessel, and which includes means for pumping the substantially same quantity or mass of cool air back into the pressurized solar collector. Air is used as the heat transfer means and as the working fluid, and the invention provides a solar engine which possesses unlimited life and which is of simple construction and operation, adaptable for use in individual power supply systems.

The terms and expressions which have been used are used as terms of description and not of limitation, and there is no intention in the use of such terms and expressions of excluding any equivalents of any of the features shown or described, or any portions thereof, and it is recognized that various modifications are possible within the scope of the invention claimed.

What is claimed is:

1. A solar engine comprising a thin-walled pressure vessel capable of containing and heating air by means of solar energy, and a diaphragm air motor connected to said vessel and adapted to be driven by a mass of heated air from said vessel, said air motor including a housing defining a chamber having a movable diaphragm therein dividing said chamber into spaced chamber portions, one of said portions comprising air pump means adapted for pumping a substantially equal mass of cool air into said vessel as compared to the first mentioned mass of heated air, said air motor having excess power output means capable of doing work, and including check valve means on the output side of said pump means and the intake side of said vessel, for preventing reverse flow of air from said intake side in a direction toward said pump means, said diaphragm being secured adjacent its periphery to said housing, and including a generally central head portion to which a rod is secured, said rod extending exteriorly of said housing, and adapted for coupling to means for doing work, the central sections of the interior surface of said housing that are disposed in confronting relation to said head portion being of a configuration to generally snugly receive said head portion in generally engaged relation in the respective maximum stroke positions of said rod and attached head portion, the interior surface sections of said housing laterally of said central sections being generally convex, and engaging the portions of said diaphragm outwardly from said head portion in generally surface-to-surface relation in said respective maximum stroke positions of said rod and attached head portion, for increasing the efficiency of said engine.

2. A solar engine in accordance with claim 1 wherein said rod is operatively coupled to a flywheel disposed exteriorly of said housing, cam means on said flywheel, said flywheel being fixed to a shaft for causing rotation of the shaft, said cam means turning with said shaft, valve means coacting with said air motor for opening the motor intake from the pressure vessel and closing the pump means intake from atmosphere, linkage means coacting with said cam means for actuating said valve means in a manner whereby air in the other chamber portion of said motor is exhausted to atmosphere on the upstroke of said head portion and rod and inlet air from atmosphere is permitted to enter said one chamber portion of said pump means on the upstroke of said head portion and rod, said valve means being operated by said cam means to isolate said pump means from atmospheric inlet air and to open the motor intake from said pressure vessel on the power stroke of said head portion and rod, and the periphery of said head portion being generally arcuate so as to prevent a sharp bending of said diaphragm adjacent the periphery of said head portion during operation of said air motor.

3. A solar engine in accordance with claim 1 wherein said head portion comprises a pair of spaced plates between which is disposed said diaphragm, said rod extending through aligned openings in said plates and diaphragm and clamping the latter together, the peripheries of said plates being generally arcuate so as to prevent a sharp bending of said diaphragm at said plate peripheries as the diaphragm flexes during operation of said air motor.

4. A solar engine in accordance with claim 1 wherein said vessel is of substantial surface area and has relatively thin metal walls of stainless-steel sheet defining the vessel interior for containing and heating air.

5. A solar engine in accordance with claim 1 wherein said vessel comprises a generally planar-like enclosure having a quilt-like structure of thin metal walls held together at spaced points, adapted to readily transmit by conduction, solar heat to air disposed interiorly of said enclosure.

6. A solar engine in accordance with claim 1, wherein said vessel comprises an elongated, generally planar enclosure having a quilt-like structure of thin metal walls held together at spaced points to define said quilt-like structure, and which at the ends thereof includes headers communicating with the remainder of said vessel and with said air motor, said quilt-like structure along its spaced sides comprising substantially flattened fluid tight borders.

* * * * *